March 14, 1950  R. O. HUERTAS  2,500,182
SAFETY SWITCH
Filed June 10, 1947

Inventor
RUFINO O. HUERTAS

By McMorrow, Berman & Davidson
Attorneys

Patented Mar. 14, 1950

2,500,182

UNITED STATES PATENT OFFICE 2,500,182

SAFETY SWITCH

Rufino O. Huertas, San Francisco, Calif.

Application June 10, 1947, Serial No. 753,605

1 Claim. (Cl. 200—161)

This invention relates to improvements in electrical equipment for automotive vehicles, and more particularly to an improved safety switch incorporated into the primary battery circuit of an automotive vehicle and controlled by the ignition switch of the vehicle to automatically interrupt the battery circuit whenever the ignition switch is turned to "off" position.

It is among the objects of the invention to provide an improved safety switch of simple, economical, and durable construction, adapted to be electrically connected into a main battery cable and operatively connected with the vehicle ignition switch, which safety switch is positive in operation to interrupt the battery circuit whenever the ignition switch is turned to "off" position and to re-establish the battery circuit when the ignition switch is turned to "on" position, which is easy to install, and embodies therein a fuse element to protect the vehicle electrical circuits from overload condition due to short circuiting or grounding of one or more of the circuit wires.

Other objects and advantages will become apparent from a consideration of the following description in conjunction with the accompanying drawing, wherein.

Figure 4:
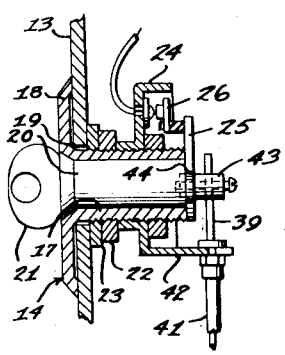
Figure 4 is a longitudinal sectional view on an enlarged scale of the ignition switch shown in Figure 1.
Figure 1:
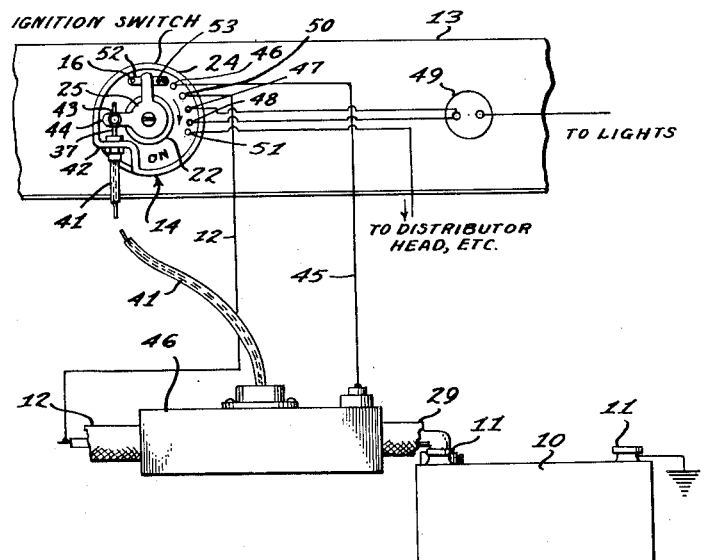
Figure 1 is a diagrammatic view showing the application of the improved safety switch to the main battery cable, ignition switch and light switch of an automotive vehicle.

With continued reference to the drawing, the automotive vehicle electrical system, referred to above, includes a storage battery 10 having terminals 11, one of which in the conventional automotive vehicle electrical system, is grounded to the vehicle frame, and the other of which is electrically connected to the hot or input side of the electrical system. The connections between the battery terminal and the vehicle frame or electrical system, are made by suitable battery cables, one of which is shown in Figure 1 and indicated at 12. Such a battery cable conventionally comprises a metallic, electrically-conductive core usually provided as a cable of twisted or woven metal wires, and an insulating covering.

The vehicle has a dash or instrument panel 13, to which is attached an ignition switch, generally indicated at 14, of conventional construction and which may include an externally-screw-threaded sleeve 17 having at one end a flange 18 overlying the instrument panel 13 around the switch-receiving-aperture 19 therein, and containing a lock cylinder 20 rotatable in the sleeve by means of a conventional key 21. The lock sleeve may be secured to the instrument panel 13 by a clamp nut 22 threaded onto the sleeve and bearing against a washer 23 interposed between the nut and the adjacent surface of the instrument panel. An electrical contact receptacle 24 is secured onto the inner-end of the sleeve 17 and a switch arm 25 is secured to the inner-end of the lock cylinder and carries a pair of contacts 16 which cooperate with fixed contacts carried by the receptacle 24 to make and break the ignition and light circuits of the vehicle when the lock cylinder 20 is rotated between its "on" and "off" positions by the key 21. In the illustration the instrument panel also carries a light switch 49.

The improved safety switch comprises an elongated body 46 of insulating material such as hard rubber or synthetic resin plastic, having openings 27 in the opposite ends thereof to receive end portions of the core of a battery cable into which the safety switch is electrically interposed, and with a transverse opening 28 intermediate its length.

When the safety switch is interposed in the battery cable, the cable may be severed and the two adjoining ends thereof electrically connected to the switch, or a separate connector, as indicated at 29 in Figure 1, may be provided to connect one end of the switch with the associated battery terminal 11.

A pair of fixed contact elements 30 are embedded in the insulating body 46 and are disposed one at each side of the transverse opening 28 and extend longitudinally of the body. Suitable screw clamps 31 are provided in the end portions of the body to electrically connect the end portions of the cable core extending into the openings 27 to the corresponding end portions of the fixed contact elements 30.

A pair of movable contact elements 32 are disposed in the opening 28 and electrically insulated from each other by a structural member 33 of insulating material which supports the two movable contact elements 32 in operative position, and also structurally connects them to the adjacent end of an arm 34, also disposed in the opening 28. A fuse 35 extending across the member 33 of insulating material electrically connects the movable contact elements 32.

A cup-shaped cap 36 overlies one end of the transverse opening 28 and is secured to the body 46 by suitable means such as the screws 37 extending through the cap flange and into the body surrounding the opening. The casing 38 of a motion-transmitting device, such as a Bowden wire 41 extends through an aperture in the end-wall of the cap and is rigidly secured thereto. The core 39 of the Bowden wire extends through the cap and is operatively connected to the end of arm 34 opposite the end of this arm which is connected to the movable contact elements 32.

Figure 2:
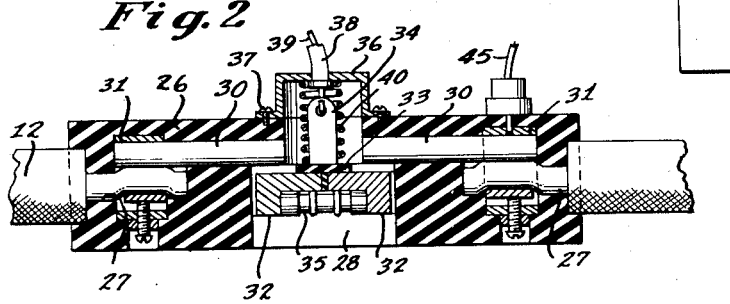
Figure 2 is a longitudinal sectional view of the improved safety switch showing the contacts thereof in circuit-interrupting position.
Figure 3:
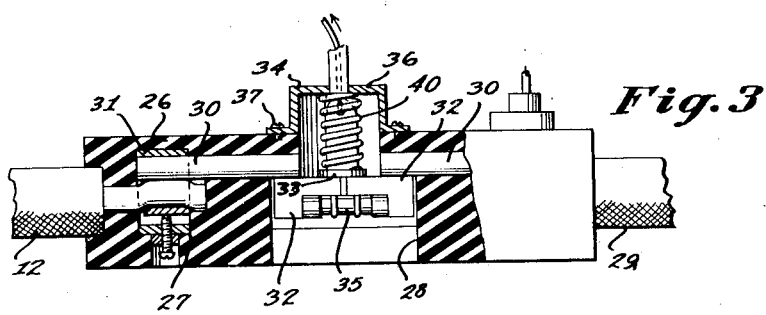
Figure 3 is a view similar to Figure 2 showing the contact elements of the switch in circuit-closing position.

A coiled compression spring 40 surrounds the arm 34 and bears at one end against the end-wall of the cap 36, and at its opposite end against the member 33 of insulating material to resiliently urge the movable contact elements 32 away from the fixed contact elements 30 to the circuit opening or interrupting position illustrated in Figure 2.

The Bowden wire 41 extends to the ignition switch 16 where the casing 38 is secured to an arm 42 extending outwardly from the contact receptacle 24 in a direction substantially parallel to the axis of the lock cylinder 20. The core 39 extends through the arm or bracket 42 and is secured in a swivel fitting 43, secured to the outer end of arm 44 which extends radially outwardly from the ignition switch arm 25. With this construction, when the lock cylinder 20 is rotated to move the switch from its "off" to its "on" position, the core 39 will be pulled through the casing 38 moving the movable contact 32 against the compression of spring 40 into electrical contact with the fixed contact elements 30 to complete the battery circuit whenever the ignition switch is turned to its "on" position. When the lock cylinder 20 is rotated to bring the ignition switch to its "off" position, the core 39 will be pushed through the casing 41 tending to move the movable contact elements 32 away from the fixed contact elements 30 thereby interrupting the battery circuit. Movement of the movable contact elements away from the fixed contact elements is also effected by the force of spring 40 when the tension on the core wire 39 is released.

With the improved safety switch incorporated in one of the battery cables the electrical circuit including the battery 10 will be broken or interrupted whenever the ignition switch is turned off, and there will be no danger of the wasting of battery current through short circuiting or grounding of any of the wires of the vehicle electrical system. The fuse 35 protects the electrical system against any overload condition if there is a ground or short circuit existing at the time the safety switch is closed, and will also protect the battery and the electrical system in case of malfunctioning of the battery-charging generator. The safety switch also protects the vehicle against fire in case of collision as all current may be cut off by turning of the ignition switch or by blowing of the safety switch fuse, and renders theft of the vehicle almost impossible as the ignition circuit cannot be completed by by-passing the ignition switch.

As it is sometimes necessary to leave the vehicle lights on when the ignition current is interrupted, means have been provided whereby a rotational movement of the key 21 insufficient to turn on the ignition current is effective to connect the vehicle light circuit with the battery. While this may be accomplished in various ways, in the illustrated arrangement a conduit 45 leads from the clamp 31 at the battery side of the safety switch to a contact 46 in the ignition switch. Two separated contacts 47 and 48 are connected to the light switch 49, the battery cable 12 at the far side of the safety switch from the battery is connected to a contact 50 in the receptacle 24 and the ignition circuit is connected to a contact 51. The carrier 52 which supports and electrically connects the contacts 26 carries an extra contact 53 which cooperates with the contacts 47 and 48 to first connect the light switch to the battery through conduit 45 without connecting the ignition circuit to the battery, and later connect the light switch and ignition circuit to the battery through the battery cable 12 and safety switch.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

A safety switch for incorporation into a storage battery cable comprising an elongated body of insulating material having an opening in each end thereof adapted to receive battery-cable-end portions and a transverse opening therethrough, fixed contact elements in said body disposed one at each side of and extending respectively from said end openings into said transverse opening, a pair of electrically insulated movable contacts in said transverse opening movable into and out of contact with said fixed contact elements, a fuse carried by and electrically connecting said movable contact elements, an arm in said transverse opening structurally connected to and electrically insulated from said movable contact elements, a cap overlying one end of said transverse opening, a spring acting between said cap and said movable contacts to resiliently urge said movable contacts away from said fixed contacts, motion-transmitting means extending through said cap and operatively connected to said arm to move said movable contact elements into contact with said fixed contact elements, a pair of clamps in said body, electrically connected one with each of said fixed contacts, for respectively receiving said battery-cable-end portions, and means carried by each clamp for compressing the fixed contacts respectively into electrically conductive contact with said battery-cable-end portions.

RUFINO O. HUERTAS.

REFERENCES CITED

The following references are of record in the file of this patent:

UNITED STATES PATENTS

| Number | Name | Date |
|---|---|---|
| 680,336 | Linton | Aug. 13, 1901 |
| 1,000,523 | Illsley | Aug. 15, 1911 |
| 1,616,956 | Farrell | Feb. 8, 1927 |
| 1,935,509 | Leeah et al. | Nov. 14, 1933 |
| 1,968,726 | Vick et al. | July 31, 1934 |
| 1,995,946 | Schild | Mar. 26, 1935 |
| 2,215,247 | Murphy | Sept. 17, 1940 |
| 2,234,607 | Riedmaier | Mar. 11, 1942 |
| 2,277,671 | Williams et al. | Mar. 31, 1942 |